United States Patent [19]
Nadkarni et al.

[11] 3,911,078

[45] Oct. 7, 1975

[54] METHOD FOR REMOVING ARSENIC AND ANTIMONY FROM COPPER ORE CONCENTRATES

[75] Inventors: Ravindra M. Nadkarni, Arlington; Charles L. Kusik; Herman P. Meissner, both of Winchester, all of Mass.

[73] Assignee: Arthur D. Little, Inc., Cambridge, Mass.

[22] Filed: Sept. 20, 1972

[21] Appl. No.: 290,442

[52] U.S. Cl. .................. 423/87; 423/27; 423/561
[51] Int. Cl. .................. C01b 27/00; C01b 29/00; C01g 29/00; C22b 31/00; C22b 33/00; C22b 37/00
[58] Field of Search .......... 75/6, 101 R; 423/27, 47, 423/48, 87, 566, 561

[56] References Cited
UNITED STATES PATENTS

| | | | |
|---|---|---|---|
| 796,849 | 8/1905 | MacArthur | 423/87 |
| 1,685,772 | 10/1928 | Booge et al. | 423/566 |
| 2,329,816 | 9/1943 | Betterton et al. | 423/87 |
| 2,344,104 | 3/1944 | Peirce | 423/566 |
| 3,107,977 | 10/1963 | Borvali et al. | 423/602 |
| 3,709,680 | 1/1973 | Holmes et al. | 75/6 |

OTHER PUBLICATIONS

Remy, Treatise on Inorganic Chemistry, 1956, pg. 660, (Vol. 1).
Agladze, Extraction of Arsenic from Sulfidic Arsenous Ores, Tr. Insta. Metalla i Gorn. Dela. An Gruzssr, 1957, Vol. 8, pp. 155–161.
Holmes, General Chemistry, 1925, p. 382.
Jacobson, Encyclopedia of Chemical Reactions, 1956, Vol. 6, pp. 358–359.
Akademiianauk gruziuskoi USSR–Instituta Metalla I Gornoso Dela. Trudy–Vol. 8, 1957– pp. 155–161, Agladze et al.

*Primary Examiner*—Oscar R. Vertiz
*Assistant Examiner*—Eugene T. Wheelock
*Attorney, Agent, or Firm*—Schiller & Pandiscio

[57] ABSTRACT

Method for removing essentially all of the chemically bonded arsenic and antimony from copper sulfide ores. The arsenic and antimony are selectively leached out using $Na_2S$ in a basic solution. The resulting $Na_3AsS_4$ and $Na_3SbS_4$ are converted to the sulfides or to ferric arsenate and ferric antimonate for safe disposal. Sodium and sulfur values are recovered for recycling in the process.

18 Claims, 6 Drawing Figures

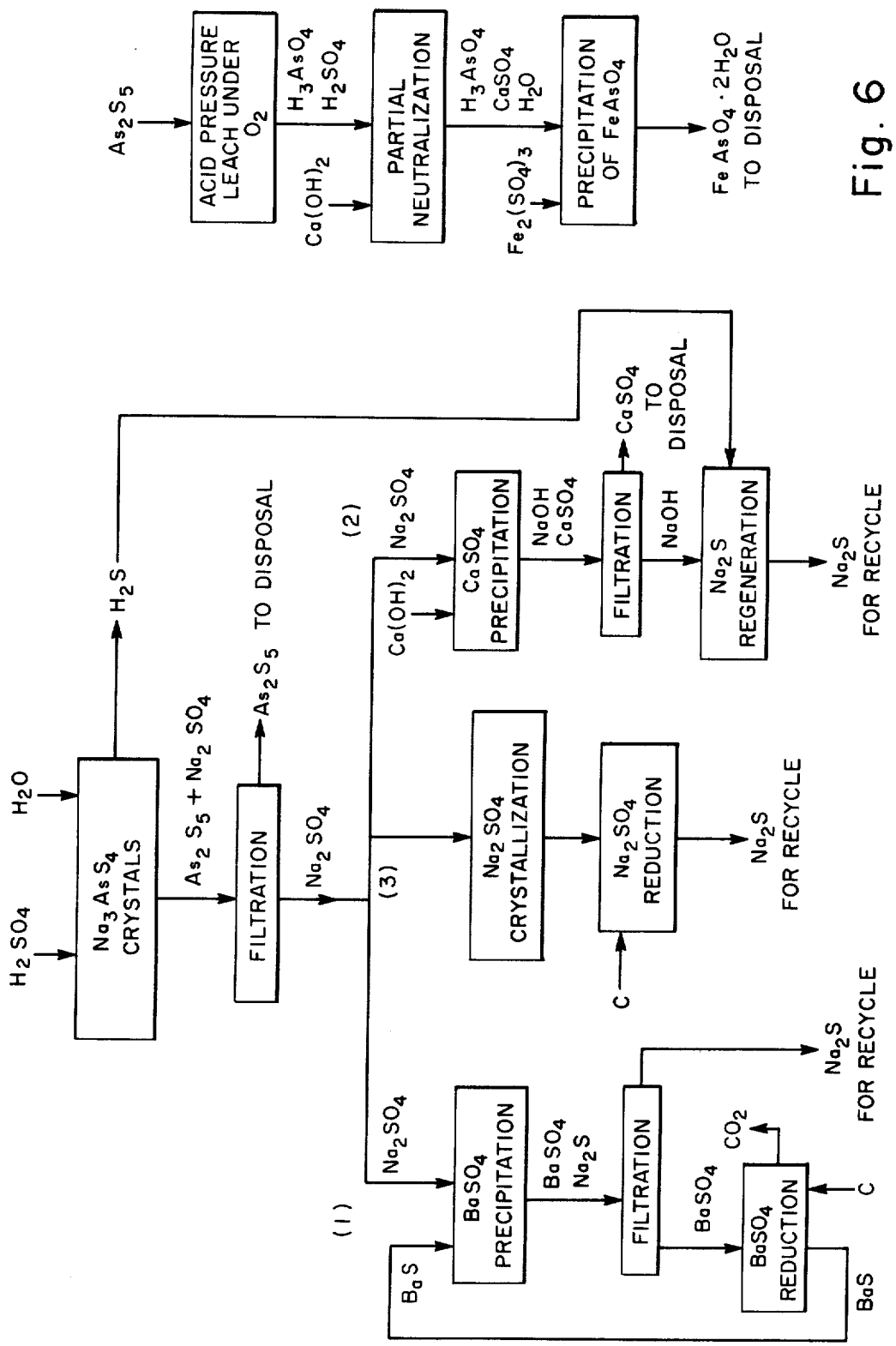

METHOD FOR REMOVING ARSENIC AND ANTIMONY FROM COPPER ORE CONCENTRATES

This invention relates to a method for treating copper ore concentrates, and more particularly to a method for removing arsenic and antimony from copper ore concentrates containing relatively large quantities of one or both of these elements.

Several types of copper ore, particularly enargite, contain relatively large quantities of arsenic, e.g., as much as 10–15% by weight and may contain appreciable quantities of antimony, e.g., up to 2% by weight. Both of these elements must be removed in the production of copper metal, and it is highly desirable that they be removed from the ore concentrates prior to shipping to the smelter to eliminate smelter penalties and to reduce shipping weight. Moreover, it is essential that the arsenic and antimony be removed by a method which minimizes pollution control problems and produces waste products in a form in which they can be conveniently, economically and safely disposed of. Finally, the cost of removing these elements from copper ore concentrates at or near the mine should not exceed the social and economic benefits resulting from the elimination of smelter penalties and from lowering the shipping costs.

It is therefore a primary object of this invention to provide an improved process for removing arsenic and antimony from copper ore concentrates. It is another object to provide a method of the character described which is a nonpolluting hydrometallurgical procedure and which converts the arsenic and antimony into compounds which may be easily and safely disposed of. An additional object is to provide a method for selectively removing arsenic and antimony from copper ore concentrates to leave a copper sulfide residue with a particle size distribution typical of flotation concentrates. Still another object of this invention is to provide a method of the character described which does not remove appreciable amounts of valuable gold and silver values and which does not oxidize the sulfur in the copper ore concentrate to sulfur dioxide. It is a further object to provide such a method which makes possible a choice of reactants for forming disposable arsenic and antimony compounds which may be either the sulfides or ferric arsenate and ferric antimonate. Other objects of the invention will in part be obvious and will in part be apparent hereinafter.

In accordance with this invention, arsenic (along with any antimony present) is removed from copper ore concentrates by leaching the ore with an aqueous solution of sodium sulfide containing sodium hydroxide. The undissolved copper sulfide in the form of particles is removed by filtering to leave a pregnant solution containing dissolved sodium thioarsenate and sodium thioantimonate which are then converted to the sulfides or to ferric arsenate and ferric antimonate by one of several reaction routes. The amount of sodium sulfide in the leaching liquid is preferably in excess of the stoichiometric quantity required to react with all of the arsenic and antimony present in the copper ore concentrate and the excess sodium sulfide is preferably recycled to the leaching step.

The following detailed description of the method of this invention will be directed to the removal of arsenic from copper ore concentrates. It is to be understood, however, that the method is also applicable to the removal of any antimony present by completely analagous chemical reactions. Likewise, it is also applicable to ores which contain antimony as well as arsenic. It is not felt that it is necessary to write the corresponding equations for the reactions which involve antimony since they may be readily deduced from those written for the reactions involving arsenic.

The invention accordingly comprises the several steps and the relation of one or more of such steps with respect to each of the others thereof, which will be exemplified in the method hereinafter disclosed, and the scope of the invention will be indicated in the claims.

For a fuller understanding of the nature and objects of this invention, reference should be had to the following detailed description taken in connection with the accompanying drawings in which FIG. 1 is a diagram of the first two steps of the method of this invention, i.e., leaching and separation of the leach slurry into clean $Cu_2S$ copper ore concentrate and a pregnant solution containing dissolved arsenic and antimony;

FIG. 3 is a diagram illustrating the steps in the use of sulfuric acid to convert the arsenic in the thioarsenate crystals to arsenic sulfide and to recover $Na_2S$ for recycling;

FIG. 6 is a diagram illustrating the conversion of the arsenic sulfide obtained by the methods shown in FIGS. 3, 4 and 5 to ferric arsenate.

Figure 1:
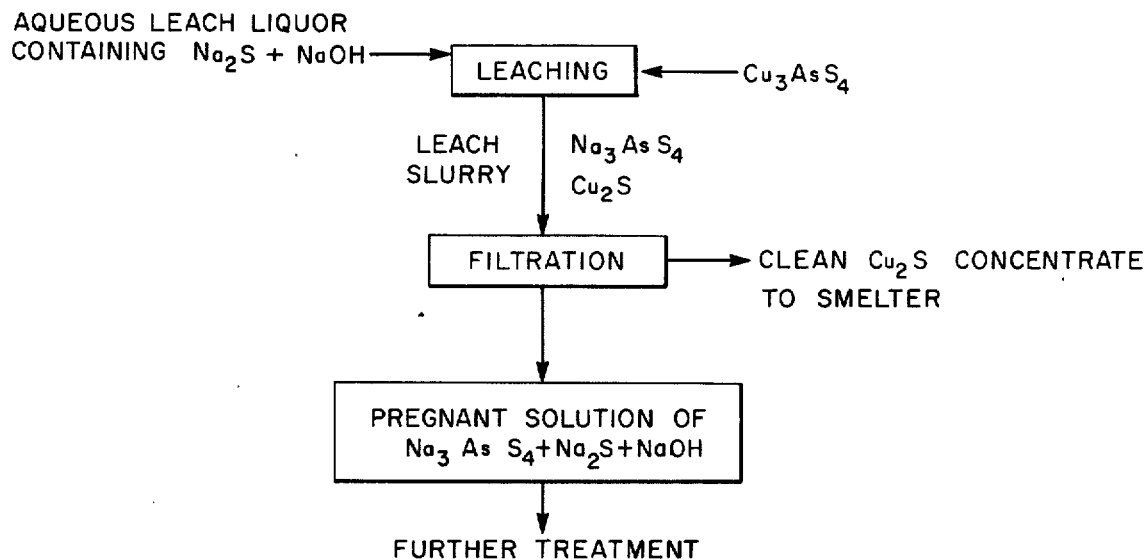

A typical arsenic containing copper sulfide mineral may be assumed to be $Cu_3AsS_4$, wherein both the copper and arsenic exist as the sulfide. The first step of the method of this invention as diagrammed in FIG. 1 is based upon the fact that sodium sulfide will dissolve sulfides of arsenic and antimony. For arsenic-containing copper ore the solution of arsenic is according to the reaction

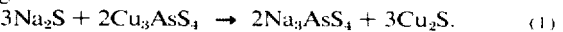
$3Na_2S + 2Cu_3AsS_4 \rightarrow 2Na_3AsS_4 + 3Cu_2S.$ (1)

In the method of this invention, the first step of leaching out the arsenic, and any antimony, is accomplished by contacting the ore concentrate with an aqueous basic solution of sodium sulfide containing sodium hydroxide or other hydroxyl ion to prevent the formation of $SH^-$ ions at the expense of $S^=$ ions. The concentration of the aqueous solution may range from about 1.5 to 3.5 molar $Na_2S$ and from about 0.2 to 1.0 molar NaOH or other hydroxyl ion. A preferable leaching liquid contains about 160 grams of $Na_2S$ and about 10 grams of NaOH per liter, equivalent to about 2 molar $Na_2S$ and to 0.25 molar NaOH. When an appreciable amount of antimony is present in the copper ore concentrate (e.g., more than about 1% by weight) then it may be preferable to increase the concentration of the NaOH in the Na₂S leach liquid up to as much as 3 molar.

The amount of Na₂S contained in the leach liquid should be equal to or preferably in excess of the stoichiometric quantity required to react with all of the arsenic and antimony present in the ore to form the thioarsenate and thioantimonate. The dissolution of arsenic from the ore is assumed to follow the equation $$2Cu_2AsS_4 + 3S^= \rightarrow 2AsS_4^\equiv + 3Cu_2S \qquad (2)$$

which shows that 1.5 moles of sulfide are required per mole of arsenic. It is preferable in leaching to use about 2 to 3 times the stoichiometric quantity of sodium sulfide, or about 3 to 4.5 moles of Na₂S for every mole of arsenic and every mole of antimony present. The presence of this excess Na₂S assures essentially complete removal of the arsenic and antimony. The upper stoichiometric ratios of Na₂S and the concentration of Na₂S in the leach liquid may be influenced by the possibility of the oxidation of the Na₂S during leaching and should therefore be maintained at levels below which any appreciable oxidation occurs.

Leaching is preferably carried out at an elevated temperature between about 80°C and 106°C and for a time to complete the dissolution of the arsenic and antimony present in the ore concentrate particles. At these elevated temperatures and atmospheric pressure, this dissolution is normally complete in several hours, e.g., in about 2 to 5 hours. It is perferable to provide the ore concentrate in the form of particles ranging in size from about 100- to 400-mesh.

Subsequent to the dissolution of the arsenic and antimony, as detailed in reaction (1), the copper sulfide particles in the leach slurry, essentially free of arsenic and antimony but still containing most or all of their original gold and silver values, are separated from the pregnant solution by filtration and dried. In this condition and containing less than one percent by weight of arsenic and antimony they may be reduced to copper by any suitable smelting process. Filtration of the leach slurry is preferably carried out at a temperature between about 60°C and 106°C.

Because the arsenic in the pregnant solution is in the form of soluble thioarsenate, $AsS_4^\equiv$, it is necessary to convert it chemically to an inert, insoluble form for safe disposal. Of all of the arsenic compounds known, the arsenic sulfides, AsS, As₂S₃ or As₂S₅, and ferric arsenate (Scorodite, FeAsO₄.2H₂O) are considered to be the least toxic and most inert, i.e., least susceptible to being dissolved to form a water-soluble contaminant. Therefore, the step of removing the arsenic from the pregnant solution is directed to the formation of arsenic sulfide, hereinafter represented as As₂S₅, or FeAsO₄. Likewise, the step of removing the antimony from the pregnant solution is directed to the formation of antimony sulfide or ferric antimonate.

Since an excess amount of sodium sulfide is present in the leach liquor and is therefore transferred to the pregnant solution, it is highly desirable from an economic point of view to be able to recover this sodium sulfide prior to the conversion of the sodium thioarsenate to a safe disposable form and to recycle it to the leaching step. It is also highly desirable to recover the sodium values from the product sodium thioarsenate in the form of Na₂S for recycling.

Figure 2:
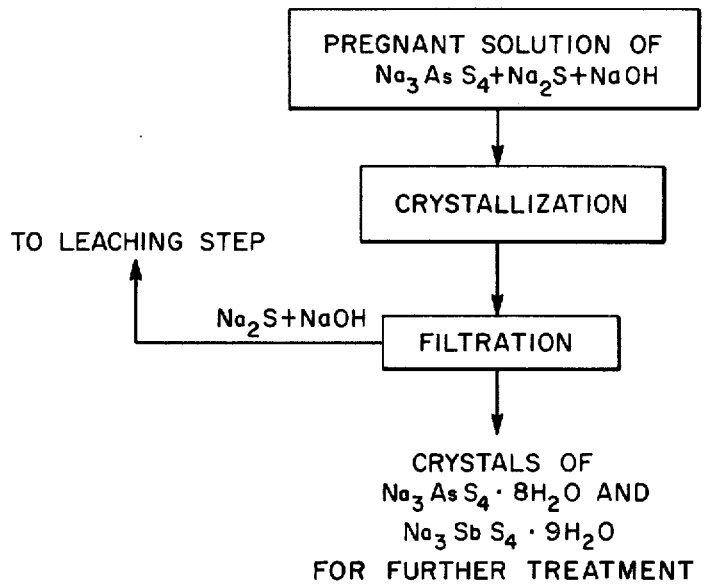
FIG. 2 is a diagram illustrating the recovery of free $Na_2S$ in the pregnant solution by the crystallization of sodium thioarsenate and sodium thioantimonate from the pregnant solution.

The free Na₂S in the pregnant solution is recovered by crystallizing out the sodium thioarsenate and sodium thioantimonate by well-known methods such as evaporation or cooling. The crystals are separated by filtering and the Na₂S solution is returned to the leaching step. FIG. 2 is a diagram of this series of steps. After the free Na₂S in the pregnant solution is recovered in this manner, one of the following three series of steps can be used to recover the combined sodium sulfide from the thioarsenate and thioantimonate and to convert these compounds to insoluble forms such as arsenic sulfide and antimony sulfide or ferric arsenate and ferric antimonate.

FIG. 3 is a diagram of the steps employed in the removal of arsenic from a solution of sodium thioarsenate through acidification with a strong mineral acid. Although it is possible to use one of several strong mineral acids, e.g., sulfuric, hydrochloric, nitric and phosphoric, sulfuric acid is preferred since it is usually the cheapest acid available, and is used as exemplary in the following description as well as in FIG. 3.

In the acidification of the pregnant solution the desired arsenic compound As₂S₅ is precipitated out through the mechanism representable by equation (3)

$$3H_2SO_4 + 2Na_3AsS_4 \rightarrow As_2S_5\downarrow + 3Na_2SO_4 + 3H_2S \qquad (3)$$

In order to remove essentially all of the arsenic from the pregnant solution as As₂S₅, it is necessary to add sufficient sulfuric acid to lower the pH of the reaction system liquid to 5 and preferably to 4 or below. With the completion of H₂S evolution, the pH may then drop to about 1. Although the concentration of the sulfuric acid added is not critical, it is preferred to use a relatively concentrated acid, e.g., 3 normal or above.

As will be seen in the diagram of FIG. 3, the As₂S₅, in the form of a lemon-yellow precipitate, is then filtered out and disposed of in a suitable manner, such as by burying. The filtrate, which contains product sodium sulfate in solution can be treated in one of three alternative ways to recover the the sodium values present in the sodium sulfate. These alternative routes are designated as (1), (2) and (3) in FIG. 3.

The first alternative route for the treatment of the Na₂SO₄ involves the reaction with barium sulfide to form barium sulfate and sodium sulfide and the recovery of the barium values as barium sulfide for recycling.

Barium sulfide and sodium sulfate undergo a double decomposition reaction $$Na_2SO_4 + BaS \rightarrow BaSO_4\downarrow Na_2S \qquad (4)$$

with the barium sulfate precipitating out essentially quantitatively. Filtration separates out the solid BaSO₄ from the resulting Na₂S solution, the latter being suitable for use as leach liquid. The barium values are then recovered by reacting the barium sulfate with carbon in a reduction kiln under known conditions which include a reduction temperature of about 700-1000°C and 400 pounds of carbon per ton of BaSO₄.

$$BaSO_4 + 2C \rightarrow BaS + 2CO_2. \qquad (5)$$

Any makeup barium values can be added in the form of natural barite (BaSO₄) to the reduction kiln. The BaS solution is obtained by dissolving the kiln residue in hot water, and is then recycled. The conditions which give rise to these reactions involved in this first alternative way of recovering sodium values from the sodium sulfate are all well-known to the inorganic chemist and need not be detailed.

The second alternative route for the recovery of the sodium values as $Na_2S$ involves the precipitation of calcium sulfate by the reaction $$Na_2SO_4 + Ca(OH)_2 \rightarrow CaSO_4\downarrow + 2NaOH. \quad (6)$$

After the removal of the calcium sulfate by filtering, the sodium hydroxide solution is reacted with a portion of the hydrogen sulfide generated in the acidification of the pregnant solution $$2NaOH + H_2S \rightarrow Na_2S + 2H_2O. \quad (7)$$

Before recycling these reaction products to the leach liquid, it may be desirable to concentrate the sodium sulfide solution. As in the first alternative route, the conditions for the inorganic reactions involved in this second route are wellknown and are therefore not discussed in detail.

The third alternative series of steps for recovering the sodium values as $Na_2S$ involves the crystallization of $Na_2SO_4$ from the solution and the subsequent reduction of the $Na_2SO_4$ with carbon by the reaction $$Na_2SO_4 + 2C \rightarrow Na_2S + 2CO_2. \quad (8)$$

As in the previous two alternatives, the conditions for this route are well known and are therefore not discussed in detail.

Figure 4:
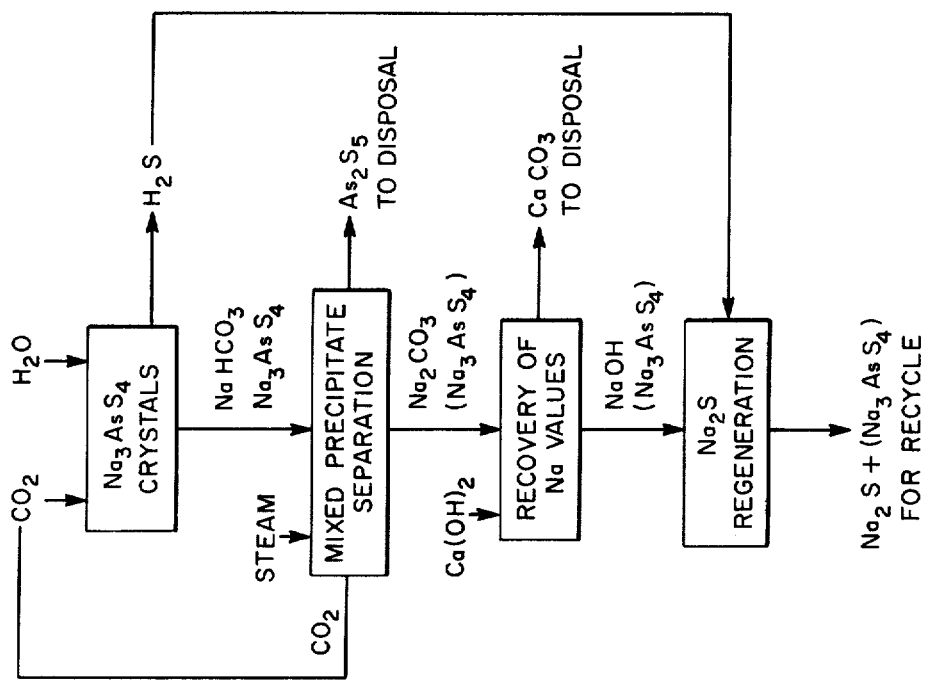
FIG. 4 is a diagram illustrating the steps in the use of carbon dioxide absorption to convert the arsenic in the thioarsenate crystals to arsenic sulfide and to recover $Na_2S$ for recycling.

The second embodiment included in this invention for treating the solution of thioarsenate is diagrammed in FIG. 4 and it, too, may be considered as a form of mild acidification. This second embodiment comprises treating the sodium thioarsenate solution with carbon dioxide gas. As is well known, $CO_2$ dissolves in water to form carbonic acid $$CO_2 + H_2O \rightarrow H_2CO_3. \quad (9)$$

As the pH of the solution decreases, the following reaction occurs $$2Na_3AsS_4 + 7H_2CO_3 \rightarrow 6NaHCO_3\downarrow + As_2S_5\downarrow + 3H_2S\uparrow. \quad (10)$$

As will be shown in FIG. 4 and illustrated in the examples which follow, a portion of the sodium thioarsenate remains in solution and is carried through the steps for the recovery of sodium values as sodium sulfide. This unprecipitated sodium thioarsenate is then returned along with the recovered sodium sulfide to the leach solution.

Sodium bicarbonate can then be extracted from the mixed precipitate by heating with steam which converts the bicarbonate to soluble carbonate $$2NaHCO_3 \rightarrow Na_2CO_3 + H_2O + CO_2. \quad (11)$$

The $CO_2$ is available for recycling while the $Na_2CO_3$ is treated with lime $$Ca(OH)_2 + Na_2CO_3 \rightarrow CaCO_3\downarrow + 2NaOH. \quad (12)$$

The sodium hydroxide is then reacted with the hydrogen sulfide formed in the $CO_2$ treatment step to form $Na_2S$ and water according to reaction (7) above.

Figure 5:
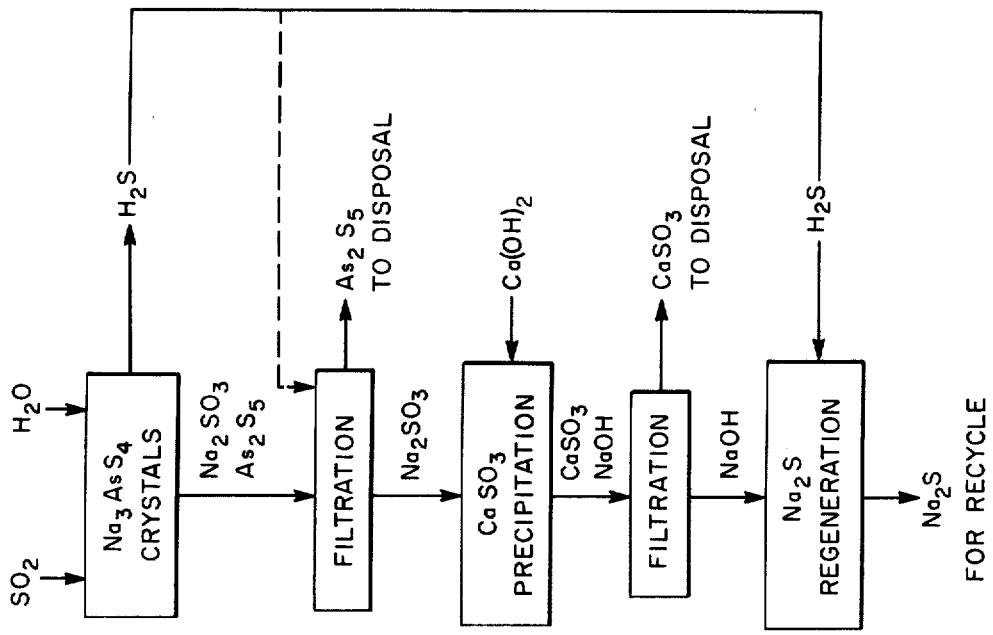
FIG. 5 is a diagram illustrating the steps in the use of sulfur dioxide absorption to convert the arsenic in the thioarsenate crystals to arsenic sulfide, and to recover $Na_2S$ for recycling.

The third embodiment of the treatment of the thioarsenate solution, which is diagrammed in FIG. 5, is also a form of acidification, using $SO_2$. It is well known that $SO_2$ dissolves in water to form sufurous acid, $H_2SO_3$, which is a much stronger acid than $H_2CO_3$. Therefore, the reaction which occurs when $SO_2$ gas is introduced into the sodium thioarsenate solution may be represented as $$2Na_3AsS_4 + 3H_2SO_3 \rightarrow 3Na_2SO_3 + As_2S_5\downarrow + 3H_2S. \quad (13)$$

After filtration of the precipitated $As_2S_5$ the filtrate is treated with lime to precipitate calcium sulfite and form sodium hydroxide. The sodium hydroxide is reacted with hydrogen sulfide and the sodium is recovered as $Na_2S$ as shown in reaction (7).

An alternative approach is to oxidize the sodium sulfite to sodium sulfate with air $$Na_2SO_3 + \frac{1}{2}O_2 \rightarrow Na_2SO_4 \quad (14)$$

and then utilize one of the three methods illustrated in FIG. 3 for conversion of $Na_2SO_4$ to $Na_2S$.

Sulfur dioxide must be introduced until a pH of about 5 is attained. Due to the fact that a portion of the $H_2S$ which is formed is converted to free suflur by the reaction $$2H_2S + SO_2 \rightarrow 3S° + 2H_2O, \quad (15)$$

complete precipitation of the arsenic as $As_2S_5$ cannot be accomplished with $SO_2$ alone. Therefore, if it is necessary to remove essentially all of the arsenic from the sodium thioarsenate solution, it is necessary to add $H_2S$ to the final acidic solution and precipitate $As_2S_5$ as is practiced in qualitative analysis.

The arsenic sulfide produced by any one of these three method embodiments described for sodium thioarsenate treatment may be converted to ferric arsenate, $FeAsO_4$, as the disposable arsenic compound as diagrammed in FIG. 6. The precipitated $As_2S_5$ is acid pressure leached (typically under a pressure of from about 10 to 200 psig) in an autoclave $$As_2S_5 + 10O_2 + 8H_2O \rightarrow 2H_3AsO_4 + 5H_2SO_4. \quad (16)$$

The resulting acid mixture is partially neutralized by addition of lime $$H_2SO_4 + Ca(OH)_2 \rightarrow CaSO_4 + H_2O \quad (17)$$

to effect pH control. Subsequently to or concurrently therewith ferric sulfate is added to convert the arsenic to the insoluble ferric arsenate or Scorodite $$2H_3AsO_4 + Fe_2(SO_4)_3 \rightarrow 2FeAsO_4 + 3H_2SO_4. \quad (18)$$

The sulfuric acid may be recycled for use in acidification of the sodium thioarsenate solution.

The following examples, which are meant to be illustrative and not limiting, are given to further describe this invention.

The copper ore concentrate used was undried enargite which contained 9% water by weight and 11% arsenic by weight on a dry basis. In all of the examples 54.5 gms of this ore concentrate, in the form of particles ranging in size from 100- to 400-mesh, was leached with 150 ml of a leach liquid which contained 30 gms of $Na_2S$ (about 2.5 molar) and 1.5 gm NaOH (0.25 molar). The amount of $Na_2S$ in the leach liquid was three times the stoichiometric quantity required to react with the arsenic present. Leaching was carried out in a 250-ml round bottom flask fitted with a mechanical stirrer, thermometer and access port for removing samples. The flask was controllably heated and a water-cooled condenser was installed to permit refluxing the enargite slurry at the boiling point of the leach solution. The flask was charged with the weighed amount of enargite concentrate and the requisite amount of sulfide solution. Heat was then applied to bring the solution to a boil (106°C), and once boiling had begun was reduced to maintain a slow, rolling boil throughout the duration of the extraction. Stirring with an electrically driven mechanical stirrer was provided to ensure that the reaction mixture was a well-mixed slurry. After the onset of boiling periodic samples of the slurry were withdrawn, filtered immediately and the filtrate analysed for dissolved arsenic by standard atomic absorption spectrometric techniques capable of minimum detectability in the range of 5–10 μg/ml. Knowing the complete removal of the arsenic from the 0.073 moles of As in the 54.5 gram sample would amount to 37 mg As/ml in the leach liquor made it possible to determine the extent of arsenic removal from the ore concentrate. The samples of the slurry which were withdrawn from the reactor were filtered through Whatman No. 41 paper and the filtrate was retained for arsenic measurement. At the end of the experiment, the slurry remaining in the reactor was vacuum filtered and sucked as dry as possible. The collected filtrate volume was noted. At the end of 2 hours, over 90% of the arsenic had been removed and at the end of 4 hours virtually all (over 98%) had been transferred to the leach liquor.

In this laboratory-scale run, when the amount of $Na_2S$ in the 150 ml of leach liquid was reduced to the stoichiometric quantity required to react with the arsenic content of the ore, only about 13% of the arsenic was removed after 5 hours. In large-scale industrial equipment it is expected that more efficient mixing and contacting could be expected to increase this percentage of arsenic removal while using less $Na_2S$. Increasing the NaOH content by a factor of 10 in the leach liquid containing this stoichiometric amount of $Na_2S$ increased arsenic removal to about 62% after 5 hours of leaching. Thus it will be seen that the amount of $Na_2S$ and NaOH relative to the amount of arsenic present has a direct bearing on the efficiency of arsenic removal and the time required to effect it.

Additional runs were made as described above to determine the effect of varying the sodium sulfide concentration in the leach liquid on arsenic extraction. Since little incremental benefit is obtained using concentrations above about 2.5 molar sodium sulfide, it is preferable to keep the sodium sulfide concentrations as low as possible while still accomplishing arsenic removal. For example, if there is a possibility that sodium sulfide may oxidize slowly over time, presumably the oxidation will be faster with higher concentrations of sodium sulfide. Also, at lower concentrations, the amount of occluded sodium sulfide going out with the filter cake will tend to be lower; thus, losses will be minimized at lower concentrations. For any given type of equipment, condition of mineral particles (e.g., wettability), mixing efficiency etc., it is within the skill of the art to determine optimum concentrations.

When sodium hydroxide concentration is below about 0.25 molar there may be sufficient hydrolysis of the sulfide ion to the hydrosulfide ion to prevent complete reaction of the sodium sulfide with the arsenic in enargite.

Although it may be preferable to use the $Na_2S$ in stoichiometric ratios of three times that required to obtain removal of essentially all of the arsenic, additional experimental results have shown that more than 90 percent arsenic extraction can be attained in reasonable leaching times of 3 or 4 hours with a stoichiometric ratio of two times the amount needed to complete the following reaction:

$$2Cu_3AsS_4 + 3Na_2S \rightarrow 2Na_3AsS_4 + 3Cu_2S.$$

The stoichiometric ratio chosen will therefore be that required to attain a desired balance between such factors as reaction time, the percent of arsenic removal desired and the possibility of oxidation of the sodium sulfide in the leach.

As the leaching is continued and the $Na_2S$ solution derived from the pregnant solution as filtrate is recycled over and over again (carrying with it minor amounts of dissolved arsenic and antimony in the form of sodium thioarsenate and sodium thioantimonate) it may be necessary to increase leaching time by a small amount to insure removal of a predetermined amount, e.g., 90%, of the arsenic from the ore concentrate.

Leaching may be carried out in multiple steps and even in a countercurrent system if desired. Enargite was leached 1.5 hours using (2.5M $Na_2S$, a stoichiometric ratio of 2; 0.25M NaOH) to about 88% arsenic removal. After filtering the concentrate was then subjected to a further treatment with a duplicate fresh leach solution. Preferably this fresh leach solution is obtained from the $Na_2S$ regeneration steps. Arsenic concentrations in the copper sulfide residue were reduced to 0.5–0.6% and antimony to 0.04 to 0.05%. Since the ratio of arsenic to antimony was about the same in head and tail samples, it appeared that the antimony was leached out at about the same rate as arsenic under these conditions.

Analyses of a number of pregnant liquors, prior to the crystallization of the $Na_3AsS_4$ indicated from about 1 to 10% of the gold content and some 5 to 6% of the silver content of the total amount present in the ore concentrate may be dissolved in the $Na_2S$ leaching. A major quantity of this gold and silver may be recovered from the $Na_2S$ solution prior to recycling.

Sodium thioarsenate was found to have a very steep solubility curve. By leaching and then filtering off the pregnant solution at temperatures as high as practical and preferably between about 60°C and the boiling point (100°–106°C) of the leaching solution, the product sodium thioarsenate remains in solution during leaching and filtering. It is, however, readily crystallized out from the pregnant solution by cooling with or without seeding. Due to the steep solubility curve, crystallization of sodium thioarsenate and sodium thioantimonate is readily accomplished in this manner.

In the following examples illustrating the further processing of the thioarsenates to form arsenic sulfide or ferric arsenate, the product sodium thioarsenate and sodium thioantimonate were crystallized out of the pregnant solutions by cooling to about 40°C. The resulting thioarsenate crystals (and thioantimonate crystals where present) were dissolved in water to form a sodium thioarsenate solution for processing.

Separate sodium thioarsenate solutions thus obtained were then subjected to the various combination of steps described for precipitation of the sulfides. The first solution sample was titrated with approximately 3N $H_2SO_4$. Indicator papers were used to measure pH as the titration proceded. The initial sodium thioarsenate solution has a pH>12 indicating the presence of some $S^=$, $OH^-$ and perhaps $SH^-$. During a preliminary neutralization of these ions the pH remained at the original high level. However, with continuing addition of acid the pH dropped quickly to between 7 and 8, $H_2S$ evolution was detected and a first lemon-yellow permanent precipitate was formed. As the titration was continued, the pH dropped slowly from about 7 to about 5 with the continuing, evolution of $H_2S$ and precipitation of the lemon-yellow precipitate. Finally, gas evolution and precipitation ceased, the precipitate agglomerated and the pH dropped quickly to approximately 1. After titration, the acidified solution was filtered and the filtrate was analyzed for dissolved arsenic. No detectable arsenic ($<5\mu g$/ml) was found, indicating that essentially all of the arsenic had been removed as the sulfide.

Another sample of the sodium thioarsenate solution was treated with gaseous $CO_2$. A 6-gram portion of $Na_3AsS_4 \cdot 8H_2O$ (equivalent to about 0.96 gms arsenic) was dissolved in 20 ml of water and placed in a 200-ml pressure bottle. Then the bottle was connected to a carbon dioxide tank, flushed with carbon dioxide gas, and finally pressurized to 15 psig and a purge rate of about 1 liter per minute established. After reacting (with stirring) for 1 hour under those conditions, the solution was observed to be deep yellow in color, the odor of hydrogen sulfide could easily be detected in the gaseous effluent, but no precipitate was observed. The pressure was then increased to 30 psig, the flow rate adjusted to about 1 liter per minute, and the reaction allowed to proceed for 16 hours. At the end of this time, some yellow-brown precipitate was observed in the reaction flask. The flask was opened, the precipitate filtered off, and its weight determined to be about 0.12 gram (equivalent to 0.06 gram arsenic if the precipitate were $As_2S_5$). The filtrate was analyzed for soluble arsenic by atomic absorption and was found to contain a total 0.91 grams of arsenic. Thus, reaction overnight with carbon dioxide at 30 psig precipitated about 5–6% of the initial arsenic and 95% was found to remain in solution.

At the conclusion of the 16 hour experiment mentioned above, the pH of the solution was determined to be about 6 immediately after the vessel was opened. But upon opening, a good deal of effervescence was noted and the pH was observed to rise rather rapidly up to a value of about 8.

The fact that in this experiment the pH could not be brought below that point where a major portion of the arsenic could be converted to $As_2S_5$ was attributed to the buffering behavior of the large amount (on the order of 1 molar) of sodium bicarbonate formed. Thus in using $CO_2$ to precipitate the arsenic it might be necessary to supplement the action of the $H_2CO_3$ with an additional strong acid such as $H_2SO_4$ or to recycle the arsenic containing solution as shown in FIG. 4.

Using a third sample of a sodium thioarsenate crystals, $SO_2$ was substituted for $CO_2$. Six grams of hydrated $Na_3AsS_4$ (equivalent to about 0.96 gram arsenic) was dissolved in 30 ml of water. Sulfur dioxide at atmospheric pressure was bubbled through this solution at a rate of 10 ml per minute. Sulfur dioxide absorption was observed to be quite rapid, particularly when compared to the absorption of carbon dioxide. After flowing for only a few minutes a precipitate was observed in the solution and the pH dropped to about 6. The precipitate was filtered and its dry weight determined to be 0.04 grams. The filtrate was then returned to the reactor and the introduction of sulfur dioxide was continued until the solution pH had fallen to about 2. During this second step, additional precipitate was observed, and at the completion of the step, it was filtered and weighed. Some solids were observed to pass through the filter into the filtrate. The residue obtained after filtration of the final reaction mixture was dried and its weight determined to be 1.34 grams. If all the arsenic in solution had been precipitated, the precipitate would have weighted 1.57 g or 1.99 g, depending on whether the precipitate was $As_2S_3$ or $As_2S_5$. Since the precipitate weighed less than this, less than complete elimination of arsenic is indicated.

A sample of the dried solids was analyzed for sulfur content and this was determined to be 48.2%. This suggests a mixture of sulfides, $As_2S_3$ and $As_2S_5$, with perhaps some free sulfur.

If total arsenic removal is desired, then $H_2S$ generated in the reaction between the sodium thioarsenate and sulfur dioxide may be bubbled through the pH 6 solution to precipitate all of the arsenic as $As_2S_5$ as is practiced in qualitative analyses.

It is therefore possible by the method of this invention to extract essentially all of the arsenic, and any antimony with it, from copper sulfide ore concentrates and to form the arsenic and antimony thus extracted into compounds suitable for direct disposal. The arsenic-free ore concentrate is in a desirable particle size range for further processing to extract copper without introducing any arsenic pollutants into the atmosphere. Moreover, most of the precious metals (silver and gold) remain in the concentrate for recovery by standard procedures.

It will thus be seen that the objects set forth above, among those made apparent from the preceding description are efficiently attained and, since certain changes may be made in carrying out the above method without departing from the scope of the invention, it is intended that all matter contained in the above description shall be interpreted as illustrative and not in a limiting sense.

We claim:

1. A method of treating an enargite copper ore containing arsenic and antimony to remove the arsenic and antimony therefrom, comprising the steps of
   a. leaching copper enargite containing chemically combined arsenic and antimony with an aqueous leach solution of sodium sulfide, present in a concentration ranging between about 1.5 and 3.5 molar, containing hydroxyl ions in a concentration of between about 0.2 and 3 molar, at a temperature between about 80°C and the boiling point of said leach solution for a time sufficient to dissolve out essentially all of said arsenic and antimony and form sodium thioarsenate and sodium thioantimonate, the amount of said leach solution being that which will provide said sodium sulfide in a quantity between about two and three times the stoichiometric quantity required to react with all of the arsenic and antimony present in said ore concentrate;
   b. filtering the resulting leach slurry at a temperature between about 60° and about 100°C to remove the arsenic and antimony-free copper ore concentrate from the leach liquor and to give a filtrate in the form of a pregnant solution containing said sodium thioarsenate and sodium thioantimonate dissolved therein;
   c. removing said sodium thioarsenate and sodium thioantimonate from said pregnant solution by crystallization and subsequent filtration; and
   d. subjecting said sodium thioarsenate and sodium thioantimonate to an acid treatment thereby to precipitate said arsenic and antimony as arsenic sulfide and antimony sulfide.

2. A method in accordance with claim 1 including the step of recovering sodium sulfide from the liquor resulting from said acid treatment.

3. A method in accordance with claim 1 wherein said hydroxyl ions are provided as sodium hydroxide.

4. A method in accordance with claim 1 wherein said crystallization of step (c) comprises cooling said pregnant solution.

5. A method in accordance with claim 1 wherein said step of subjecting said crystals to an acid treatment comprises reacting said sodium thioarsenate and said sodium thioantimonate with sulfuric acid to reduce the pH to about 5 thereby to precipitate the sulfides of arsenic and antimony and form sodium sulfate and hydrogen sulfide.

6. A method in accordance with claim 5 including the step of dissolving said crystals in water prior to reacting said sodium thioarsenate and sodium thioantimonate with said sulfuric acid.

7. A method in accordance with claim 5 further including the steps of filtering out the precipitated sulfides of arsenic and antimony to form a filtrate containing said sodium sulfate and converting said sodium sulfate to sodium sulfide for recycling as at least a portion of said aqueous leach solution.

8. A method in accordance with claim 7 wherein said step of converting said sodium sulfate to sodium sulfide comprises reacting said sodium sulfate with barium sulfide to form sodium sulfide and barium sulfate.

9. A method in accordance with claim 8 including the further step of reducing the product barium sulfate with carbon to form barium sulfide for reaction with said sodium sulfate.

10. A method in accordance with claim 7 wherein said step of converting said sodium sulfate to sodium sulfide comprises reacting said sodium sulfate with calcium hydroxide to form sodium hydroxide and calcium sulfate and regenerating said sodium sulfide by reacting said sodium hydroxide with said hydrogen sulfide formed in said acid treatment of said sodium thioarsenate and sodium antimonate.

11. A method in accordance with claim 7 wherein said step of converting said sodium sulfate to sodium sulfide comprises reducing said sodium sulfate by reaction with a reducing agent.

12. A method in accordance with claim 7 including the steps of acid pressure treating said sulfides of arsenic and antimony under oxygen to form a mixture of arsenic, antimonic and sulfuric acids, partially neutralizing said acid mixture to form a sulfate salt and reacting said arsenic and antimonic acids with ferric sulfate to form insoluble ferric arsenate and ferric antimonate.

13. A method in accordance with claim 1 wherein said step of subjecting said sodium thioarsenate and sodium thioantimonate to an acid treatment comprises bubbling carbon dioxide gas through an aqueous solution of said sodium thioarsenate and sodium thioantimonate until the pH of said solution levels off at a minimum value thereby converting a portion of the arsenic and antimony to the sulfides.

14. A method in accordance with claim 13 including the step of adding sulfuric acid to said solution to complete the precipitation of the arsenic and antimonic sulfides.

15. A method in accordance with claim 1 wherein said step of subjecting said sodium thioarsenate and said sodium antimonate to an acid treatment comprises bubbling sulfur dioxide gas through an aqueous solution of said sodium thioarsenate and sodium antimonate until a pH of about 2 is attained thereby forming sulfides of arsenic and antimony, sodium sulfite and hydrogen sulfide.

16. A method in accordance with claim 15 including the step of bubbling said hydrogen sulfide through said aqueous solution after attainment of said pH of about 2 thereby to complete the precipitation of said sulfides of arsenic and antimony.

17. A method in accordance with claim 15 including the further steps of converting said sodium sulfite to sodium hydroxide and then regenerating sodium sulfide from said sodium hydroxide by reacting it with said hydrogen sulfide formed in said acid treatment.

18. A method in accordance with claim 15 including the steps of oxidizing said sodium sulfite to sodium sulfate and then regenerating sodium sulfide from said sodium sulfate.

* * * * *

UNITED STATES PATENT OFFICE
CERTIFICATE OF CORRECTION

PATENT NO. : 3,911,078
DATED : October 7, 1975
INVENTOR(S) : RAVINDRA M. NADKARNI ET AL It is certified that error appears in the above-identified patent and that said Letters Patent are hereby corrected as shown below:

Column 10, line 62 should read:

c. crystallizing said sodium thioarsenate and said sodium thioantimonate in said pregnant solution to form a recycle liquid containing sodium sulfide and hydroxyl ions;

d. separating said precipitated sodium thioarsenate and said sodium thioantimonate from said recycle liquid by filtration;

e. using said recycle liquid directly in said leaching step; and f. subjecting said sodium thioarsenate and sodium thioantimonate to an acid treatment thereby to precipitate said arsenic and antimony as arsenic sulfide and antimony sulfide.

Signed and Sealed this second Day of March 1976

[SEAL]

Attest:

RUTH C. MASON
*Attesting Officer*

C. MARSHALL DANN
*Commissioner of Patents and Trademarks*